United States Patent Office 3,354,020
Patented Nov. 21, 1967

3,354,020
DECORATIVE RETICULATED FOAM-FIBROUS
PAD AND METHOD OF MAKING THE SAME
Richard S. Copeland, Grand Rapids, Mich., assignor to
Sackner Products, Inc., Grand Rapids, Mich., a corporation of Michigan
Filed Feb. 17, 1964, Ser. No. 345,416
4 Claims. (Cl. 161—53)

ABSTRACT OF THE DISCLOSURE

A decorative embossed laminate of a layer of skeletal open cell resilient polymeric foam forming a matrix, and with fusible fibers embedded in and projecting from the surface of the skeletal foam layer, generally normal to the plane of the layer, and with an embossable thermoplastic decorative cover sheet extending over the protruding fibers and fused to the matrix layer through the fibers in a selected pattern.

---

This invention relates to a fibrous pad especially suited as a backing pad for embossed decorative laminates, and more particularly it relates to a resilient, dielectrically sealable backing pad and decorative laminate formed therefrom.

In upholstery employed often in automobiles on the seats or on the side panels or used for other like applications, dielectrically embossed cover sheets are usually attached either to a backing pad of fibrous material or a backing pad of foam material. Fibrous pads are generally less expensive and "breathe" more readily, and are subject to dielectric bonding. Foam backing pads can be provided with greater and more luxuriant compressible depth. However, foam pads have only slight breathing capacity. Also, foam pads of commonly used types, for example polyurethanes, tend to "bottom" under load rather than retaining some resilience under maximum compression. Foam pads must also be specially treated to enable dielectric bonding to be achieved through the pad layer. Even then the bonding is normally inferior to fibrous pad bonding, and usually creates a lumpy portion adjacent the bond.

Conceivably, a combination of fibers and foam might be possible to attain some good qualities of each type. However, the fibrous pad fibers are intertangled to a composite layer and the foam is an integral layer of "blind" cells and interconnected cell walls. The "combination" of a fibrous layer laminated on a foam layer only increases the embossing problem without adding to the beneficial qualities of either.

It is an object of this invention to provide a special fiber-foam type backing pad that is a unique combination of elements to form a dielectrically embossable decorative laminate having the good qualities of each prior type without the undesirable qualities.

It is an object of this invention to provide a fiber-foam pad having excellent resiliency, luxuriant compressive depth, free "breathing" capacity for coolness, freedom from harsh "bottoming" under load, and excellent dielectrical sealing and fusion capacity between the pad and decorative cover sheet.

Another object of this invention is to provide a unique fiber type pad wherein a major share of the fibers are generally parallel to each other and normal to the plane of the decorative cover sheet to effect optimum depth of compression. The extended fibers are, furthermore, laterally supported to have excellent axial strength under load, thereby substantially preventing permanent fiber deflection or permanent depression of the pad under load.

Still another object of this invention is to provide a combination fiber type and open cell matrix material having excellent dielectric fusion characteristics clear through the thickness of the fibers and the matrix, even though extending to a substantial depth.

Another object of this invention is to provide a combination of fibers and open skelton support matrix producible on a continuous production basis and matching or excelling ordinary foam pads in substantially all respects.

These and several other objects of this invention will become apparent upon studying the following specification in conjunction with the drawings in which.

Figure 1:
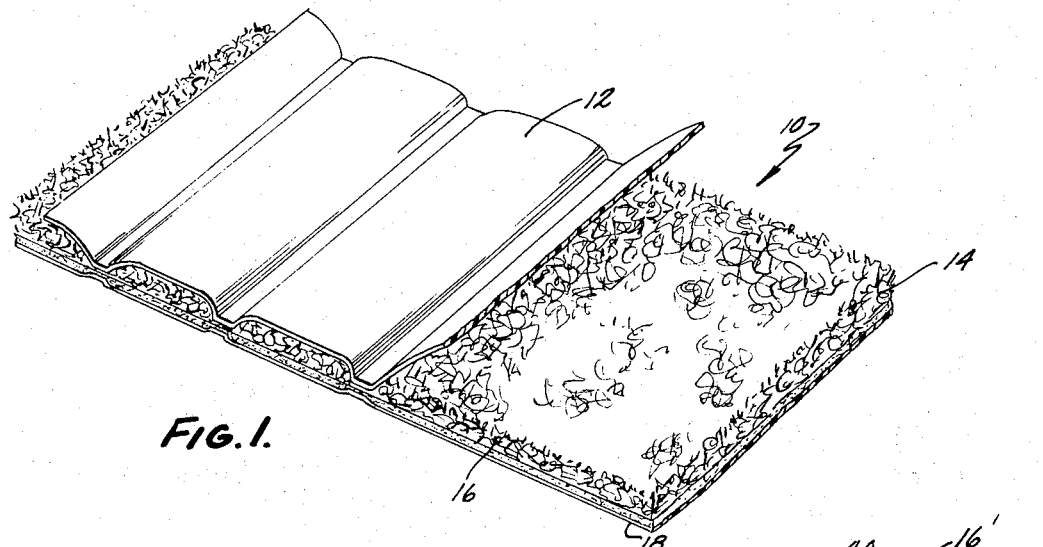
FIG. 1 is a perspective view of a section of a decorative laminate of this invention.

Referring now specifically to the drawings, the decorative laminate 10 illustrated in FIG. 1 includes a dielectrically embossable cover sheet 12, an open cell, matrix foam-like layer 14, a small layer of fibers 16 needled into this matrix layer and protruding from the opposite side at 16' (FIG. 2) under the cover sheet 12, and a reinforcing woven sheet 18 as of tobacco cloth on the back of the laminate.

The embossable cover sheet 12 may be any of several materials subject to being fused open exposure to the high voltage radio frequency alternating current conventionally imparted by dielectric sealing dies. This embossable sheet may be of any of several embossable materials including the following: vinyl polymers, e.g. vinyl chloride-acetate copolymer, vinylidenes, polyethylene, polypropylene, etc. The embossable sheet may be in the form of a solid film or sheet, or a woven sheet including straight weave, knitted, or the like. The thermoplastic sheet may be coated on the back with a thin layer of cloth or on the front with a thin layer of cloth, or may be uncoated. Further, a cloth sheet may be secured between two sheets of embossable plastic, with all of these being illustrative of various types of "decorative embossable cover sheets."

Figure 3:
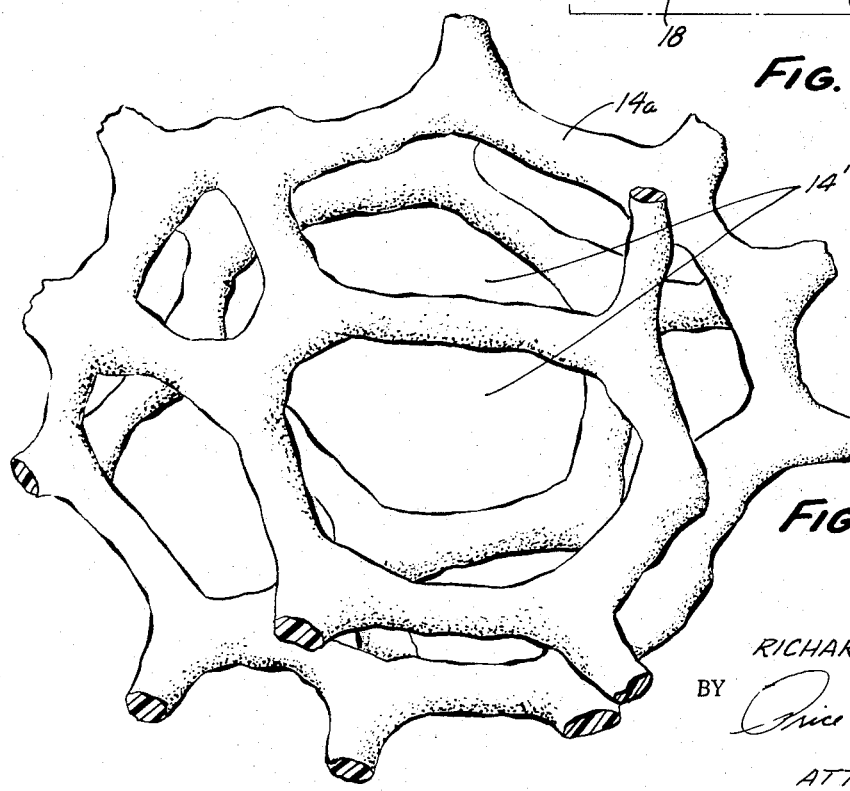
FIG. 3 is a greatly enlarged fragmentary view of a small portion of the open cell skeletal matrix employed in this invention.

The layer of open cell matrix material 14 is skeletal in structure. One cell 14' is shown greatly expanded in FIG. 3 for illustrative purposes. Normally this cell is tiny, and is one of thousands with which it is integrally interconnected. This material, of which Scott foam is probably the best known and most widely available today, is obtainable from the Scott Paper Company. It is usually formed by preparing a conventional cellular foam material as of expanded polyurethane, and then leaching the material with a dissolving reagent such as acid for a controlled time to dissolve or remove the thin membranous walls around the cell while leaving the thicker wall edges or ribs 14a which form a skeletal matrix. The structure is completely open in nature.

A typical type open cell skeletal "foam" is ¼ inch thick with a cell of ten to eighty-four pores per lineal inch. The skeletal foam matrix, to be dielectrically sealable, must be open and contain or be a substance subject to dielectric fusion. The preferred material is an expanded, leached polyurethane. It is usually sprayed or otherwise provided with a dielectrically sealable substance such as a vinyl polymer to fuse to the fibers. A typical vinyl is a vinyl chloride, or a vinyl chloride-vinyl acetate, etc. Other materials could conceivably be used, for example an expanded, polyvinyl polymer, such as a leached foam.

It will be realized that with a larger number of pores per lineal inch in this skeletal matrix, the smaller each cell is, and the more firm and less "open" the foam is. Consequently, in thin layers, more firm and less open skeletal foam will have effective dielectric bonding, while if the foam pad is thicker, then the more open and more flexible material should be employed. For example, when using a layer ¼ inch thick, the number of pores per inch can be about twenty. This will of course vary with the particular type of use involved as well as with the materials laminated therein. If the pad is to be applied to the seat of an automobile, a matrix with more firmness will be desired. If employed on an arm rest or on a door panel, a more resilient and less firm foam will be desired. These obvious variations are not difficult to achieve, and can be readily determined by one having ordinary skill in the art upon understanding the principles involved in this invention.

The fibrous material 16 employed in this invention comprises thousands of polymeric synthetic fibers, each from about ½ inch to 1½ inches in length. The fibers themselves may be of different types of material, provided they are capable of fusing to aid the dielectric sealing or of conducting heat during the dielectric process. As an example, a type 6 undrawn nylon fibrous material having a denier of about 20 is applied at the rate of approximately 12 ounces per square yard to the open skeletal matrix. It has been found that the particular amount of fibrous material can be varied, for example, from about 9 ounces per square yard, or sometimes even less, to about 15 ounces per square yard for optimum results. The exact amount must be determined from the particular thickness and openness of the skeletal matrix material employed. If too much fiber is employed for example on a matrix which is relatively rigid and less open, the fiber concentration will be too great so that the resulting product is too stiff. Again these variations are relative and the particular correlation can be readily determined by one or two trial and error steps to suit the particular application involved and results desired. A complete listing of all these variations would only be superfluous here, since anyone having ordinary skill in the art can readily achieve these upon understanding the inventive concept.

It may be desired in some instance to replace the nylon with a completely fusible fibrous thermoplastic material or of combining nlyon with fusible material. Suitable thermoplastic materials include acrylics such as polymethyl methacrylate, polystyrene, celluloid-acetate, vinylchloride-vinylacetate copolymer, nylon 66, polypropylene, and others. In fact, other nonfusible materials could even conceivably be added in small amounts, including natural fibers such as natural wool, or viscose, etc. However, the dominant share of the fibers should be a material which will fuse or conduct the dielectrically induced heat.

The fibers 16 employed in combination with the matrix are originally dropped onto the surface of the matrix layer 14 in generally random orientation, with a substantial share of the fibers being in a horizontal parallel to the plane of the matrix layer. In the final form of the invention, however, the fibers should have at least a major portion or a substantial portion generally parallel with each other and projecting from and normal to the matrix. One end portion of the individual fibers is embedded in the matrix as at 16″ in FIG. 2, with the other end protruding out in a free state as at 16′.

Figure 2:
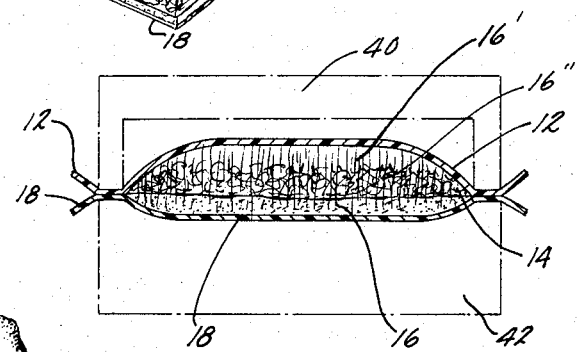
FIG. 2 is a sectional enlarged view of a portion of the laminate illustrated in FIG. 1 during embossment.

Preferably a reinforcing backing sheet 18 is applied to the back side of the laminate as illustrated in FIG. 2. This is especially true when the laminate is utilized in areas of hard usage such as automotive seating. When so employed, the backing sheet is fused to the cover sheet through the matrix and fibers during the dielectric fusion process as will be explained hereinafter. This cloth is normally open in nature, such as tobacco cloth.

*Method of formation*

Figure 4:
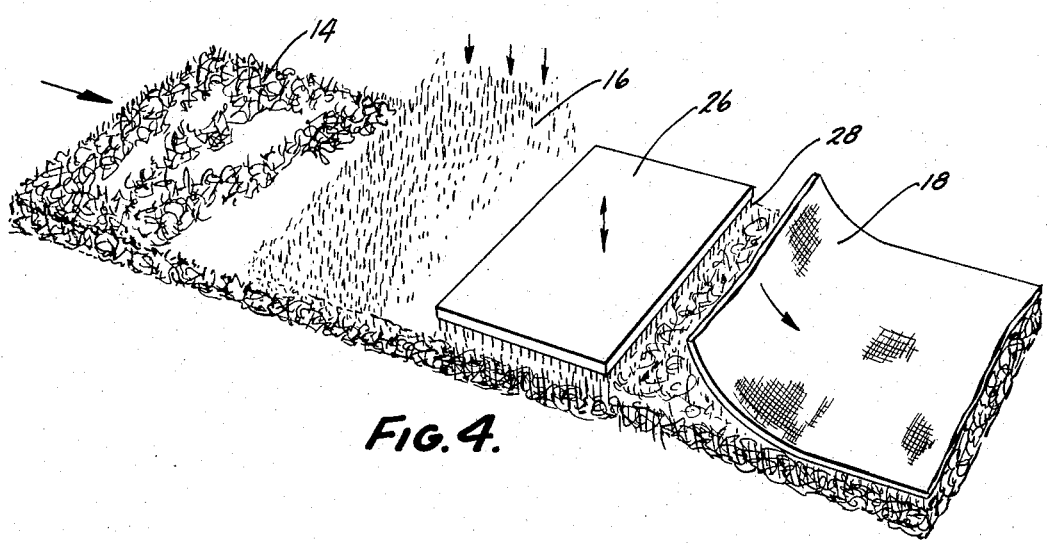
FIG. 4 is a perspective view showing the first steps in the process of forming the novel backing and decorative laminate.
Figure 5:
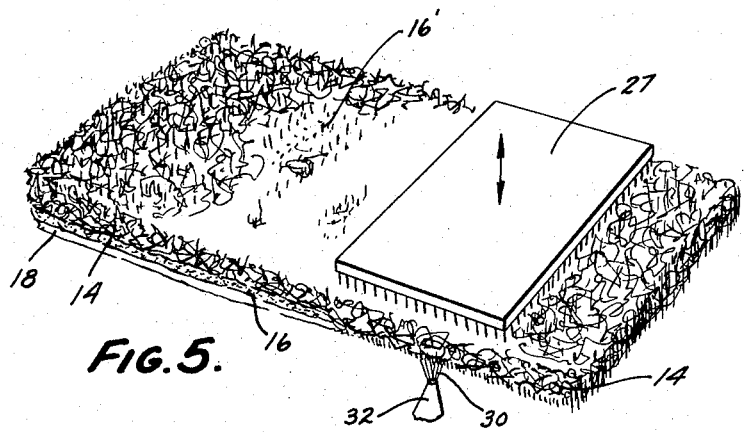
FIG. 5 is a perspective view showing a subsequent step in the pad forming process before the embossment step in FIG. 2.

Referring to FIGS. 4 and 5, the several steps of formation are shown. The open cell skeletal type foam matrix material 14 in the form of long sheets is advanced on a continuous basis. As the foam is moved in the direction indicated by the arrow in FIG. 4, the fibers 16 are applied to the upper surface of the matrix. These are loosely assembled, randomly positioned fibers placed at various angles with respect to each other in a lofty uncompacted state. Typical air pressure and/or mechanical beating equipment may be utilized to provide the lofty nature of these fibers. Subsequently, the fibers are needled down through the skeletal matrix 14 by needling equipment 26 of conventional type. With this equipment, a great number of small needles 28 arranged parallel with each other have barbed edges. These are repeatedly projected through the loosely formed layer of fibers and through the matrix to drive the lower end of the fibers down into the matrix. The number of punctures per square inch is approximately 250 to 350, with the greater number being preferable. These needles catch a substantial share of the fibers to drive them normal to the layer of matrix material. The needling proceeds smoothly and rapidly and anchors the fibers nicely due to the open skeletal structure. A substantial portion of the fibers is embedded into the matrix layer within the ribs 14a. These fibers have a portion driven clear through the matrix to protrude out the opposite side in substantially parallel fashion. These form portions 16′. A share of the fibers remain as a thin intertangled layer 16.

Then, preferably a backing sheet 18 is laid continuously over the fibers 16. In order to secure the backing sheet, the laminate is usually needled from the opposite side after inverting the layers. Sometimes it may be desirable to secure the backing sheet by the use of resin adhesive only, or in conjunction with needling, especially with resins which aid the dielectric seal. Referring to FIG. 5, after inversion so that backing sheet 18 is on the bottom, the second needling mechanism 27 is reciprocated to repeatedly project the needles through the matrix and fibers to push fibers from the small layer of fibrous material 16 through backing sheet 18. Normally the needle concentration need not be as great in this stage of the operation since a relatively small percentage of fibers pushed through the woven sheet will anchor it in place.

This backing sheet has a coating of embossable material applied to its surface. The material 30 may be sprayed on with conventional spraying equipment 32. Typical materials applied to its surface comprise a thermoplastic material or a thermosetting material in the thermoplastic state. Typical materials include vinyl polymers such as a vinyl acetate-vinyl chloride copolymer, acrylics such as polymethyl methacrylate, polystyrene, or polyethylene. It may be applied by spraying, powdering, rolling, or other conventional methods.

When the backing sheet just described is utilized for the automotive industry, normally the material formed and described is prepared and rolled into large rolls several feet in length and up to several feet in diameter. The rolls are then shipped in this condition to the manufacturers to apply the decorative cover sheet 12. This is done by placing the embossable cover sheet on top of the projected ends 16′ of the fibers, opposite backing sheet 18, and then dielectrically applying the pattern to the complete laminate while simultaneously fusing the layers together. The sealing dies 40 and 42 shown in phantom in FIG. 2 subject the materials to radio frequency current to bond the laminate. In the form of the invention illustrated in FIG. 1 the pattern is illustrated as a plurality of parallel indentations 30. Obviously any selected pattern may be achieved. Since the fibers can be compressed readily and since the open matrix assumes practically very little space when compressed, the dielectric fusion occurs readily. It should be realized that if the matrix were not open, the dielectric fusion would not readily occur through it. In fact, it has been found that the bond resulting along the dielectric pattern is extremely excellent. Great force is necessary to pull the layers apart once sealing has occurred.

This combination of the generally parallel fibers and the open matrix has several unique characteristics. Firstly, a substantial axial force can be applied to the fibers en masse since the matrix ribs provide lateral support to the fibers. This definitely holds to a minimum undue deflection of the fibers upon being loaded axially. Yet, a certain amount of flexibility is present to provide good deflection, with resiliency to return to the initial state. Consequently, strength and comfort are optimized. Also, the open cell material enables the fibers to be needled completely through the matrix to be anchored and yet protruding. With needling, at least 250 to 400 or more needle penetrations per square inch occur so that if the anchoring matrix were not open, the result would be a mere mat of wadded fibers and foam with little, if any, flexibility and resiliency. Also, dielectric sealing can be achieved through this whole laminate with resulting sharp edges and effective fusion. The sharp edges are achieved partially because of the flexibility of the fibers and the compressibility of the matrix, and partially because few of the fibers lay crosswise to have both ends caught in adjacent fusion pattern areas. With prior type fiber materials that were dielectrically sealed, even those where the fibers were randomly disposed in three dimensions, a substantial amount of the fibers were in the horizontal orientation parallel to the plane of the layer. These often had both ends caught under adjacent die edges. Consequently tension was applied on the flat fibers to cause them to pull down and compress the area between the dielectric pattern zones. This tended to round out the desirable sharp pattern edges of the embossment pattern. With this novel construction, however, the fibers above the matrix and adjacent the cover sheet are oriented vertically so that none of the fibers protruding above the skeleton are substantially horizontal. Rather, the vertically oriented fibers, when falling under the fusion sealed area, are merely compressed completely and fused into the joints, while the immediately adjacent fibers retain their vertical orientation to provide optimum sharp edges to the decorative laminate.

Most of the advantages of this new combination and method have been set forth above. However, those who study the specification and are skilled in the art, or who prepare samples according to the method and concept taught will readily see other advantages too numerous to mention at this time. Also, it is conceivable that certain minor structural modifications could be made in this combination without departing from the concept taught. Therefore, the invention is to be limited only to the scope of the appended claims and the reasonable equivalents thereto.

I claim:

1. A decorative embossed laminate comprising: a layer of skeletal, open-cell, resilient, polymeric foam forming a matrix; polymeric, fusible, synthetic fibers having one portion embedded in said layer, and the end portions extending from the surfaces thereof and substantially normal to the plane of said layer on at least one side of said matrix; an embossable thermoplastic, decorative cover sheet over the end portions extending perpendicularly from one surface of said matrix; and said embossable sheet being fused to said matrix layer through said fibers in a selected pattern.

2. A decorative embossed laminate comprising: a layer of skeletal, open-cell, resilient, polymeric foam forming a matrix; polymeric, fusible, synthetic fibers having one portion embedded in said layer, and the end portions extending from the surfaces thereof and in substantially normal relation to the plane of said layer on at least one side of said matrix; an embossable thermoplastic decorative sheet over said normal end portions; a woven reinforcing sheet along the side of said matrix layer opposite said embossable sheet; and said embossable sheet being fused to said matrix layer through said fibers and said matrix layer being fused to said reinforcing sheet, in a selected pattern.

3. A decorative embossed laminate comprising: a layer of skeletal, open-cell, dielectrically fusible, resilient, polymeric foam forming a matrix; polymeric, fusible, synthetic fibers having one portion embedded in said layer, and the end portions extending from the surfaces thereof and in substantially normal relation to the plane of said layer on at least one side of said matrix; an embossable thermoplastic decorative sheet over said normal end portions; a woven reinforcing sheet along the side of said matrix layer opposite said embossable sheet, and including fusible material; and said embossable sheet being fused to said matrix layer through said fibers and said matrix layer being fused to said reinforcing sheet, in a selected embossment pattern.

4. A method of forming a decorative laminate comprising the steps of: providing a resilient matrix layer of skeletal foam; distributing a great number of short polymeric, fusible, synthetic fibers on a face of said layer; needling said fibers down into said matrix with one end portion of said fibers being embedded in said matrix and the other end portion of said fibers being needled through said matrix and protruding from the opposite face, generally parallel to each other, and generally normal to the matrix; applying a reinforcing sheet to the side of said matrix opposite the side from which said fibers protrude; needling through said matrix, fibers, and sheet to drive fibers through said sheet and secure said sheet to the pad; applying an embossable, thermoplastic, decorative sheet over the protruding portions of said fibers; and embossing said laminate by dielectrically fusing said sheet through said fibers to said matrix and to said reinforcing sheet.

References Cited

UNITED STATES PATENTS

| | | | |
|---|---|---|---|
| 3,026,233 | 3/1962 | Scholl et al. | |
| 3,046,173 | 7/1962 | Copeland | 156—148 |
| 3,059,312 | 10/1962 | Jamieson | 161—151 |
| 3,090,099 | 5/1963 | Smith | 161—80 |
| 3,156,242 | 11/1964 | Crowe | 156—148 |
| 3,244,571 | 4/1966 | Weisman. | |

MORRIS SUSSMAN, *Primary Examiner.*

ALEXANDER WYMAN, *Examiner.*

R. H. CRISS, *Assistant Examiner.*